May 21, 1968     E. G. OBEDA     3,384,284

CONTROL CIRCUIT FOR TOOL DRIVEN BY SONIC ENERGY

Filed June 8, 1966     2 Sheets-Sheet 1

Edward G. Obeda
INVENTOR.

BY

Ervin B. Steinberg
Agent

May 21, 1968 E. G. OBEDA 3,384,284
CONTROL CIRCUIT FOR TOOL DRIVEN BY SONIC ENERGY
Filed June 8, 1966 2 Sheets-Sheet 2
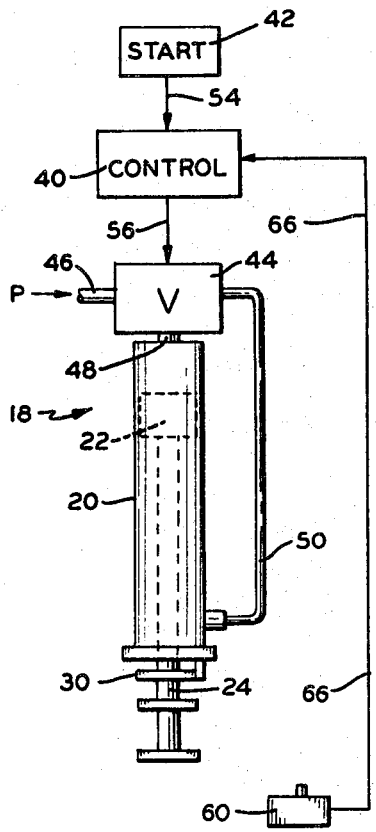
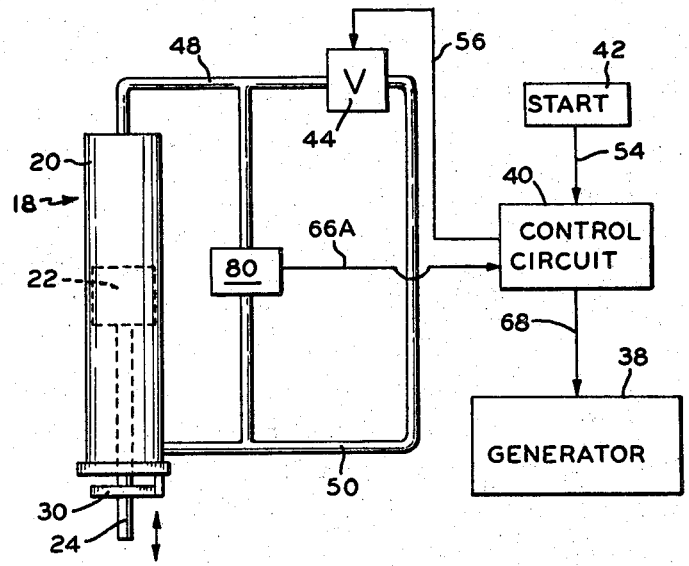
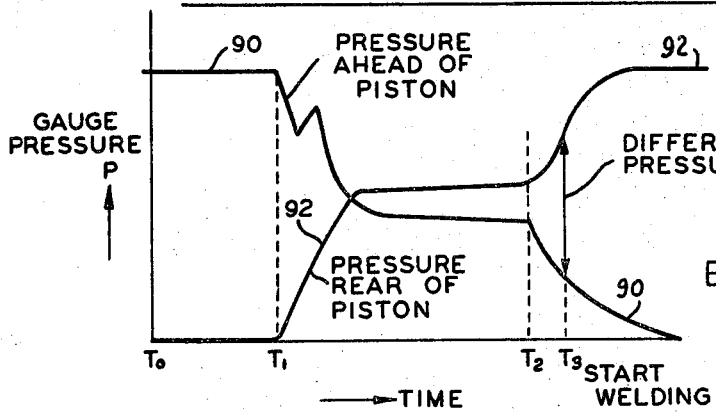
Edward G. Obeda
INVENTOR.
BY
Erwin B. Steinberg
Agent United States Patent Office 3,384,284
Patented May 21, 1968

3,384,284
CONTROL CIRCUIT FOR TOOL DRIVEN BY SONIC ENERGY
Edward G. Obeda, Brookfield, Conn., assignor to Branson Instruments, Incorporated, Stamford, Conn., a corporation of Delaware
Filed June 8, 1966, Ser. No. 556,092
16 Claims. (Cl. 228—1)

This invention broadly refers to a control circuit for a tool and, more particularly, has reference to a control circuit for a tool which is driven by sonic energy and operates on a workpiece.

Quite specifically, the present invention refers to sonic welding apparatus and similar devices in which a tool is brought into engagement with a workpiece and, upon the existence of such engagement, power means are energized to drive the tool which then transfers energy to the workpiece.

In recent years welding with sonic energy has found wide-spread application and is used for joining thermoplastic parts and metallic members. Generally, ultrasonic frequency in the range of 20 kc. per second is used to provide the energy which causes a weld. Apparatus of this type comprise essentially a converter which transforms electrical energy supplied thereto to mechanical vibrations, using either magnetostrictive or electrostrictive transducing means, an acoustic horn mechanically coupled to the converter and serving as an output transformer and an electrical generator for providing alternating current at high frequency to the converter. A welding apparatus of this type is described for instance in the patent to Robert S. Soloff et al., U.S. No. 3,224,916, issued on Dec. 21, 1965, and entitled, "Sonic Method of Welding Thermoplastic Parts."

While the converter and the output horn coupled thereto may be held manually in engagement with the parts to be welded, it has been found advantageous and convenient to automate the motion of the converter by mounting the converter on a stand and coupling the converter to a fluid controlled actuator. Thus, the pieces to be welded may be placed, for instance, on a rotary table or on a moving band for passage underneath a welding position, while the converter is moved cyclically in a reciprocating motion to alternately contact the workpiece for transferring energy thereto and subsequently to be lifted therefrom in order to permit the workpiece to leave the welding position. Even when manual feeding of workpieces to the welding position is accomplished, mounting the converter and horn to a power controlled motion means is preferred in order to free the hands of the operator solely for handling the parts.

In the application described hereinabove, the generator providing the electrical energy to the converter is started when the horn is in physical engagement with the workpiece. This condition is usually determined by an electrical limit switch which is positioned in relation to the workpiece in such a manner that the switch is actuated when the converter is moved by the actuator to a position which under nominal conditions is representative of physical engagement between the frontal surface of the horn and the workpiece. The electrical generator is then energized for a predetermined time interval, causing the converter to provide mechanical oscillations which, amplified by the horn, are transferred to the workpiece to cause welding.

Several shortcomings of this arrangement for actuating the generator are apparent. The limit switch must be set rather accurately for the travel of the converter in relation to the workpieces to be welded. Any variation in the physical size of the workpiece will affect the operation of the limit switch, that is, the switch may be actuated too early without physical contact between the workpiece and the horn having been established, or it may fail to be operated despite the existence of physical contact between the horn and the workpiece. Moreover, the switch must be repositioned when workpieces having different physical dimensions are to be welded. The positioning of the switch itself requires a certain degree of skill and must be accomplished by trial and error, that is, using a quantity of workpieces in order to determine the normal variations which exist in the parts and those which are introduced by feeding the workpieces.

Moreover, the use of very short welding cycles on some parts, e.g. less than one second, requires that the power be started in a most precise manner only when proper physical contact between the horn and workpiece is attained. In the absence of this condition, either no weld is achieved or the workpiece is scarred because of insufficient contact.

It has been found that the above-stated shortcomings may be eliminated by the use of a pressure responsive control means adapted to sense the pressure effective upon the actuator which causes the motion of the converter. This pressure information is useful for sensing the existence of physical engagement between the horn and workpiece, and, in response to such condition, actuate the generator to provide energy to the converter. More specifically, when using a fluid pressure responsive actuator comprising a cylinder and a piston, it is possible to use a differential pressure relay for sensing the fluid pressure on either side of the piston and determine the condition when the pressure causing engagement between the horn and the workpiece is greater than the pressure which causes disengagement between those parts. Upon finding the desired pressure condition, the generator is started to provide for the transfer of energy to the workpiece. It will be apparent that the use of such a pressure sensing means eliminates difficult mechanical alignment, overcomes the problems of mechanical tolerances in the workpieces and fixtures and eliminates many of the difficulties encountered heretofore.

One of the principal objects of this invention is, therefore, the provision of a new and improved control circuit for a tool which is moved into and out of engagement with a workpiece by a fluid pressure actuated device.

Another important object of this invention is the provision of a control circuit for a sonically driven tool which is positioned by fluid pressure responsive means, the circuit being responsive to fluid pressure and causes actuation of the tool when a fluid pressure responsive control element determines that physical contact between the tool and the workpiece has been attained.

Another important object of this invention is the provision of a control circuit for a tool driven by sonic energy and movable in response to fluid pressure, whereby the pressure causing said tool to move into and out of engagement with the workpiece is sensed, and an electrical generator is started upon the determination that the tool has moved into engagement with the workpiece.

A further and other object of this invention is the provision of a control circuit for a tool adapted to be driven by sonic energy, the tool being movable responsive to fluid pressure into and out of engagement with the workpiece, whereby a differential pressure relay is used to determine the condition when physical contact between the workpiece and the tool has been attained.

Further and still other objects of the invention will be more clearly apparent by reference to the following description when taken in conjunction with the accompanying drawings, in which:

FIGURE 2 is a schematic illustration showing certain portions of the arrangement per FIGURE 1;

FIGURE 3 is a schematic diagram of the control circuit showing the improvement obtained by the present invention, and FIGURE 4 is a schematic diagram of pressure versus time, illustrating the condition which prevails when the welding apparatus is brought into contact with a workpiece.

Figure 1:
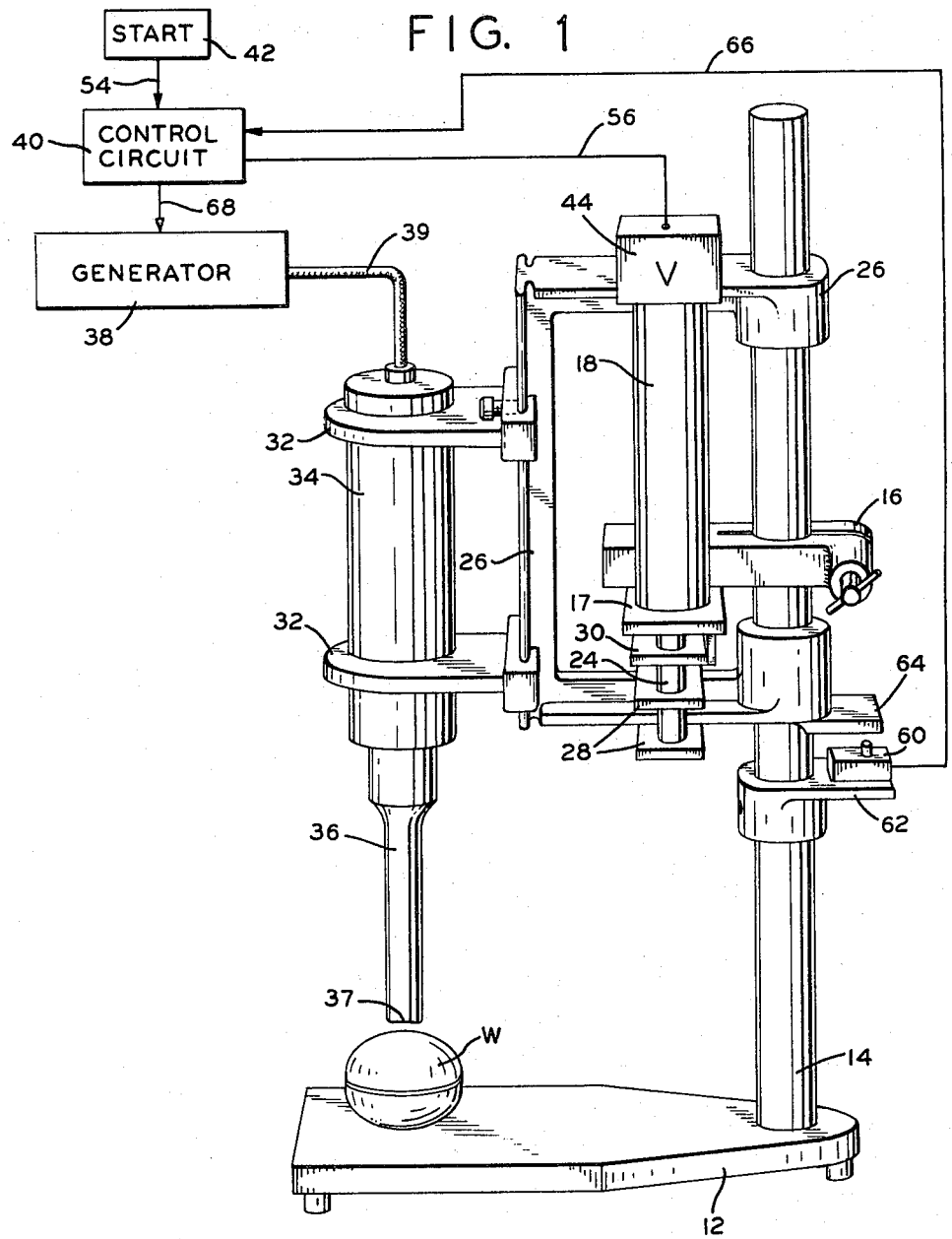
FIGURE 1 is an elevational view of a typical sonic welding appparatus.

Referring now to the figures and FIGURES 1 and 2 in particular, numeral 12 refers to a platform from which extends an upstanding column 14. The column 14 supports a flange 16 which is clamped thereto and which, in turn, retains a linear motion actuator 18 by means of an intermediate mounting plate 17. The actuator 18 comprises, quite conventionally, a cylinder 20 and an internal, movable piston 22. The piston 22 is fastened to a piston rod 24 which is coupled to a U-shaped bracket 26. The bracket 26 is supported by the column 14 and mounted for reciprocating sliding motion along this column in response to the motion of the piston. Coupling between the piston rod 24 and the bracket 26 is achieved by a set of clamp plates 28. Upward motion of the piston in the cylinder 20 is limited by a clamp plate 30.

The bracket 26 includes a set of vertically spaced apertured mounting brackets 32 which are designed to retain a sonic energy converter 34 fitted at its lower end with an output horn 36. The converter 34 includes either a magnetostrictive or a piezoelectric transducer means in order to convert the electrical energy provided thereto from the generator 38 via conductor 39 to mechanical oscillations manifest at the frontal surface 37 of the horn 36. The generator 38 is coupled electrically to a controll circuit 40 which, in turn, has a start switch 42. The switch 42 used for initiating the work cycle may be actuated by an operator or mechanical means.

The motion of the piston 22 of the actuator 18 is controlled by a conventional control valve 44 which receives fluid under normal line pressure, for instance 100 pounds per square inch, from a supply line 46. The valve 44 is a solenoid actuated device and, therefore, operable by electrical signals from the control circuit 40. Upon the receipt of the appropriate signal, the valve admits fluid pressure via a fluid line 48 to the rear of the piston or via a fluid line 50 to the front of the piston, thus driving the piston 22 respectively in a direction toward the workpiece or away therefrom. As seen in FIGURE 1, a workpiece W is disposed on the platform 12 underneath the converter 34. In a typical example, the workpiece comprises two semi-spheres which are to be welded together by sonic energy as is described in the aforementioned patent.

In the normal course of operation, the operator after having positioned a workpiece actuates the start switch 42 which then sends an electrical signal via the conductor 54 to the control circuit 40 which, in turn, sends a signal via the conductor 56 to the solenoid controller fluid valve 44. Upon receipt of the signal, the solenoid valve 44 admits fluid from the fluid supply line 46 to the fluid line 48, thus driving the piston 22 forward. Since the piston via its rod 24 is coupled to the bracket 26 which fastens the converter 34, the converter 34 is moved downwardly along the column 14 and, as the downward motion proceeds, a point is reached at which the frontal surface 37 of the horn 36 engages the stationary workpiece W. At this point, the generator 38 is actuated in order to provide the sonic energy to the converter 34 so as to apply the sonic energy from the horn 36 via the frontal surface 37 upon the workpiece W. In the heretofore known arrangement the generator 38 is actuated by an electrical limit switch 60 which is mounted upon a plate 62 which is clamped to the column 14. As the bracket 26, responsive to the motion of the piston 22, moves downward, a striker plate 64 fastened to the bracket 26 engages the actuating arm of the electrical switch 60 and causes the switch via a conductor 66 to provide a signal to the control circuit 40 for starting the generator 38 through a conductor 68. It will be apparent that the limit switch 60 must be set in relation to the striker plate 64 in such a manner that the switch is actuated when the frontal surface 37 of the horn 36 engages the workpiece W. To this end, the plate 62 is positionable at various heights along the column 14.

The control circuit 40 contains various electrical controls, including timing means in order to maintain the generator 38 energized for a predetermined "weld" interval subsequent to its actuation in response to the signal from the limit switch 60, to maintain the horn 36 in contact with the workpiece for a brief "dwell" cycle following the cessation of power, and finally to provide the control signals to the control valve 44 in order to bleed the fluid line 48 and admit pressure via the fluid line 50 to the cylinder in order to drive the piston 22 in an upward direction, whereby to lift the horn 36 from the workpiece W, and maintain this condition until the start switch 42 is operated once again.

As has been stated heretofore, the setting of the switch 60 is a critical adjustment and depends upon the dimensions of the workpiece to be welded. Depending on the tolerances of the workpiece and the accuracy with which an operator positions the workpiece, the generator may be started too early or not at all. Also when welding parts having different dimensions, the switch must be repositioned and tested. These shortcomings are quite disturbing and well understood by those familiar with ultrasonic welding.

FIGURE 3 shows the improvement provided by the present invention which eliminates the setting and adjustment of a limit switch with respect to the motion of the converter 34 relative to the workpiece W. A differential pressure relay 80 is coupled between the fluid lines 48 and 50 in order to sense the existing pressure conditions. Upon determining that a pressure differential of predetermined polarity and magnitude prevails an electrical contact disposed in the relay is closed which sends a signal via the conductor 66A to the control circuit 40, causing actuation of the generator 38 as described heretofore.

The relay 80 in a typical case is a differential pressure activated switch, Series PD 10, available from the Robertshaw Controls Company, 155 Hill Street, Milford, Conn. This switch is adjustable to provide closing of electrical controls responsive to the difference in pressure between two fluid filled pressure lines.

The use of the switch 80 in relation to the timed events will be more clearly apparent by reference to FIGURE 4 wherein the curve 90 shows the pressure in fluid line 50. Full gauge pressure prevails therein while the piston 22 is in its raised position and the converter 34, therefore, is lifted with respect to the workpiece W. At this time the fluid line 48 is substantially vented to ambient, if air is used. At the time $T_1$ the start switch 42 is operated. The control circuit 40 now causes the fluid control valve 44 to admit pressure to the fluid line 48 in order to drive the piston 22 toward the position where engagement is provided between the horn 36 and the workpiece W. The curve 92 shows a build up of this pressure in the cylinder behind the piston while the curve 90 shows the diminishing pressure in the line 50, thus permitting the piston 22 to move along its forward stroke. At time $T_2$ contact between the horn frontal surface 37 and the workpiece W is attained and it may be noted that a reversal of the pressures has occurred also. At the point $T_3$ a certain pressure differential exists, the pressure in fluid line 48 exceeding the pressure in the line 50. This pressure differential, a predetermined amount, is used to send a signal from the electrical switch contained in the differential relay 80 via the conductor 66A to the control circuit 40 for actuating the generator 38. In this manner, the generator 38 is actuated upon the determination of engagement between the horn 37 and the workpiece W, which condition is sensed solely in response to fluid pressure conditions as contrasted with a mechanical positioning means depicted in FIGURES 1 and 2. The differential relay 80 includes means for selecting the pressure differential at which contact switching occurs.

It will be apparent that the actuator 18 may be operated by air, gas or a liquid without any deviation from the principles described heretofore. Moreover, the converter 34 and horn 36, while described in connection with a sonic welding apparatus, may comprise any of a variety of tools where physical contact between the horn, broadly termed a tool, and a workpiece is desired prior to having the tool operate upon the workpiece.

The ultrasonic welding apparatus comprising the generator 38, converter 34, control circuit 40 and start switch 42 have not been described in detail as they form a standard combination which is commercially available from the Sonic Power Division, Branson Instruments, Incorporated, Danbury, Conn.

While there has been described and illustrated a certain preferred embodiment of the invention and several modifications have been indicated, it will be apparent to those skilled in the art that still further changes and modifications may be made therein without deviating from the broad principle and intent of this invention which shall be limited only by the scope of the appended claims.

What is claimed is:

1. A control circuit for a tool adapted to be driven by sonic energy, the combination of:
   a tool adapted to engage a workpiece and transfer sonic energy thereto;
   an actuator movable responsive to fluid pressure coupled to provide relative motion between the tool and a workpiece;
   a power means for energizing said tool with sonic energy for causing said tool when in engagement with the workpiece to operate upon the workpiece, and
   a control means responsive to fluid pressure coupled to said actuator and said power means for sensing responsive to fluid pressure the condition when said tool is in engagement with the workpiece and controlling said power means responsive to said condition.

2. A control circuit for a tool as set forth in claim 1 wherein said actuator moves responsive to fluid pressure in a reciprocating motion.

3. A control circuit for a tool as set forth in claim 1 wherein said tool is a sonic energy converter and includes an output horn adapted to engage the workpiece.

4. A control circuit for a tool as set forth in claim 1 wherein said power means is a high frequency generator providing energy in the ultrasonic frequency range and said actuator is coupled to said tool for moving said tool into and out of engagement with a workpiece.

5. A control circuit for a tool as set forth in claim 1 wherein said fluid pressure responsive control means is a differential pressure sensing means.

6. A control circuit for a tool as set forth in claim 5 wherein the fluid is a gaseous medium.

7. A control circuit for a tool as set forth in claim 5 wherein the fluid is air.

8. A control circuit for a tool as set forth in claim 5 wherein the fluid is a liquid.

9. A control circuit for a tool as set forth in claim 1 wherein said actuator includes a movable piston, said control means responsive to fluid pressure is coupled to sense the fluid pressure on either side of said piston and is adapted to operate said power means when the fluid pressure effective on the side of the piston for causing physical engagement between said tool and the workpiece is greater than the fluid pressure effective on the opposite side of said piston.

10. A control circuit for a sonic welding apparatus comprising in combination:
    an actuator including a cylinder and a piston movable therein responsive to fluid pressure;
    a control valve adapted to control fluid flow coupled to said actuator for controlling the motion of said piston in response to fluid pressure;
    a converter converting electrical energy to sonic energy and including a horn, said converter adapted to be coupled to said piston for movement into and out of engagement with a workpiece in rseponse to the fluid pressure responsive motion of said piston;
    an electrical generator for energizing said converter with electrical energy for causing said horn, when in engagement with the workpiece, to apply sonic energy thereto;
    a fluid pressure responsive control means coupled to either side of said piston to sense the pressure conditions in said cylinder and coupled also to said electrical generator;
    said control means adapted to sense in response to said control valve admitting fluid to said actuator and urging said horn into engagement with the workpiece the condition when the fluid pressure at the piston side for providing engagement between said horn and the workpiece attains a predetermined value in comparison with the value of the fluid pressure at the opposite side of said piston, whereby such value denotes engagement between said horn and the workpiece; and
    said control means causing said generator to energize said converter in response to the existence of said condition.

11. A control circuit for a sonic welding apparatus as set forth in claim 10 wherein said control means is a differential pressure relay and said condition is attained when the pressure in said cylinder and effective upon said piston for causing engagement between said horn and the workpiece is greater than the pressure effective upon the opposite side of said piston.

12. A control circuit as set forth in claim 11 wherein said horn when applying sonic energy to the workpiece oscillates in a direction substantially parallel to the axis along which the engagement motion occurs.

13. A control circuit for a sonic welding apparatus as set forth in claim 10 wherein said generator operates at a frequency of above 1,000 cycles per second.

14. A control circuit for a sonic welding apparatus as set forth in claim 10 wherein said control means is a differential pressure relay and includes electrical switching means for operating said electrical generator.

15. A control circuit for a sonic welding apparatus as set forth in claim 10 wherein said control means is an adjustable differential relay and said condition is attained when the pressure in said cylinder and effective upon said piston for causing engagement between said horn and the workpiece exceeds by a predetermined amount the pressure effective upon the opposite side of said piston, said horn responsive to the power provided by said generator is adapted to oscillate relative to the workpiece, and said control means responsive to the existence of said condition causes said generator to provide energy to said converter for a predetermined amount of time.

16. A control circuit for a tool adapted to be driven by sonic energy, the combination of:

a tool adapted to engage a workpiece and transfer sonic energy thereto;

an actuator movable responsive to fluid pressure coupled to provide relative motion between said tool and a workpiece, and control means responsive to fluid pressure coupled to said actuator for sensing responsive to fluid pressure the condition when said tool is in engagement with the workpiece and controlling the transfer of sonic energy responsive to such condition.

References Cited

UNITED STATES PATENTS

| | | | |
|---|---|---|---|
| 3,088,343 | 5/1963 | Balamuth | 228—1 |
| 3,029,666 | 4/1962 | Lovins | 228—1 |

RICHARD H. EANES, JR., *Primary Examiner.*